(12) United States Patent
Jiang et al.

(10) Patent No.: US 12,190,608 B2
(45) Date of Patent: Jan. 7, 2025

(54) VIRTUAL LANE MARK GENERATION

(71) Applicant: GM Global Technology Operations LLC, Detroit, MI (US)

(72) Inventors: Shengbing Jiang, Rochester Hills, MI (US); Wen-Chiao Lin, Rochester Hills, MI (US); Zhongyu Yang, Farmington Hills, MI (US); Yilu Zhang, Northville, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 365 days.

(21) Appl. No.: 17/738,328

(22) Filed: May 6, 2022

(65) Prior Publication Data

US 2023/0360408 A1   Nov. 9, 2023

(51) Int. Cl.
*B60W 30/12* (2020.01)
*G06V 20/56* (2022.01)

(52) U.S. Cl.
CPC .......... *G06V 20/588* (2022.01); *B60W 30/12* (2013.01); *B60W 2420/403* (2013.01); *B60W 2552/53* (2020.02); *B60W 2554/4045* (2020.02)

(58) Field of Classification Search
CPC .. G06V 20/588; B60W 2552/53; B60W 30/12
See application file for complete search history.

(56) References Cited

U.S. PATENT DOCUMENTS

| | | | |
|---|---|---|---|
| 2019/0050993 A1* | 2/2019 | Jang | G06V 10/82 |
| 2022/0309806 A1* | 9/2022 | Zhou | G06V 20/588 |
| 2023/0003540 A1* | 1/2023 | Kitahara | G01C 21/32 |

* cited by examiner

Primary Examiner — Sam Bhattacharya
(74) Attorney, Agent, or Firm — CANTOR COLBURN LLP (57) ABSTRACT

A vehicle, system method for operating the vehicle is disclosed. The system includes a camera and a processor. The camera is configured to obtain a camera image of a road segment. The processor determines a location of a road edge for the road segment within the camera image, obtains a lane attribute for the road segment, generates a virtual lane mark for the road segment based on the road edge and the lane attribute, and moves the vehicle along the road segment by tracking the virtual lane mark.

20 Claims, 9 Drawing Sheets

VIRTUAL LANE MARK GENERATION

INTRODUCTION

The subject disclosure relates to navigation and trajectory planning in an autonomous vehicle and, in particular, to a system and method for placing a virtual lane mark within an image of a road segment to allow improved navigation of the autonomous vehicle.

Autonomous vehicles are aided in their navigation by knowing where lane marks, such as lane separators, occur in the road. Typically, a camera image is obtained of a road segment upon which the autonomous vehicle is travelling and a location of the lane marks for the road segment are identified from the camera image. However, in various unfavorable scenarios, there is not enough information in a camera image to make it possible to discern a lane mark from the camera image. For example, the lane marks may be worn, or environmental conditions, such as rain or snow, make it so that the lane mark does not appear clearly in the image, making it difficult to locate the lane mark. Accordingly, it is desirable to provide a method for placing a virtual lane mark in the image during unfavorable scenarios.

SUMMARY

In one exemplary embodiment, a method for operating a vehicle is disclosed. A camera image of a road segment is obtained using a camera at the vehicle. A location of a road edge for the road segment within the camera image is determined. A lane attribute is obtained for the road segment. A virtual lane mark for the road segment is generated based on the road edge and the lane attribute. The vehicle is moved along the road segment by tracking the virtual lane mark.

In addition to one or more of the features described herein, the method further includes fitting a lane model equation to pixels in the camera image indicative of the road edge and generating the virtual lane mark using the lane model equation and the lane attribute. The method further includes transforming the camera image from a pixel coordinate system to a bird's eye view coordinate system and fitting the virtual lane mark to the lane model equation in the bird's eye view coordinate system. The method further includes obtaining a road segmentation image from the camera image and inputting the road segmentation image and the lane attribute into a neural network to determine the virtual lane mark. The neural network is at least one of a multilayer perception network, an autoencoder/decoder network, a conditional generative adversarial network, and a convolutional neural network. The lane attribute includes at least one of a number of lanes in the road segment, a lane width for the road segment, a host lane index, a presence of an exit lane in the road segment, a presence of a merging lane in the road segment, and a presence of an intersection in the road segment. The method further includes obtaining the lane attribute from at least one of a Global Positioning Satellite server, a map server, and a trajectory of one or more surrounding agents.

In another exemplary embodiment, a system for operating a vehicle is disclosed. The system includes a camera and a processor. The camera is configured to obtain a camera image of a road segment. The processor is configured to determine a location of a road edge for the road segment within the camera image, obtain a lane attribute for the road segment, generate a virtual lane mark for the road segment based on the road edge and the lane attribute, and move the vehicle along the road segment by tracking the virtual lane mark.

In addition to one or more of the features described herein, the processor is further configured to fit a lane model equation to pixels in the camera image indicative of the road edge and generating the virtual lane mark using the lane model equation and the lane attribute. The processor is further configured to transform the camera image from a pixel coordinate system to a bird's eye view coordinate system and fit the virtual lane mark to the lane model equation in the bird's eye view coordinate system. The processor is further configured to operate a neural network to receive the lane attribute and a road segmentation image generated from the camera image and to output the virtual lane mark. The neural network is at least one of a multilayer perception network, an autoencoder/decoder network, a conditional generative adversarial network, and a convolutional neural network. The lane attribute includes at least one of a number of lanes in the road segment, a lane width for the road segment, a host lane index, a presence of an exit lane in the road segment, a presence of a merging lane in the road segment, and a presence of an intersection in the road segment. The processor is further configured to obtain the lane attribute from at least one of a Global Positioning Satellite server, a map server, and a trajectory of one or more surrounding agents.

In yet another exemplary embodiment, a vehicle is disclosed. The vehicle includes a camera and a processor. The camera is configured to obtain a camera image of a road segment. The processor is configured to determine a location of a road edge for the road segment within the camera image, obtain a lane attribute for the road segment, generate a virtual lane mark for the road segment based on the road edge and the lane attribute, and move the vehicle along the road segment by tracking the virtual lane mark.

In addition to one or more of the features described herein, the processor is further configured to fit a lane model equation to pixels in the camera image indicative of the road edge and generating the virtual lane mark using the lane model equation and the lane attribute. The processor is further configured to transform the camera image from a pixel coordinate system to a bird's eye view coordinate system and fit the virtual lane mark to the lane model equation in the bird's eye view coordinate system. The processor is further configured to operate a neural network to receive the lane attribute and a road segmentation image generated from the camera image and to output the virtual lane mark. The neural network is at least one of a multilayer perception network, an autoencoder/decoder network, a conditional generative adversarial network, and a convolutional neural network. The lane attribute includes at least one of a number of lanes in the road segment, a lane width for the road segment, a host lane index, a presence of an exit lane in the road segment, a presence of a merging lane in the road segment, and a presence of an intersection in the road segment.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses. It should be understood that throughout the drawings, corresponding reference numerals indicate like or corresponding parts and features.

Figure 1:
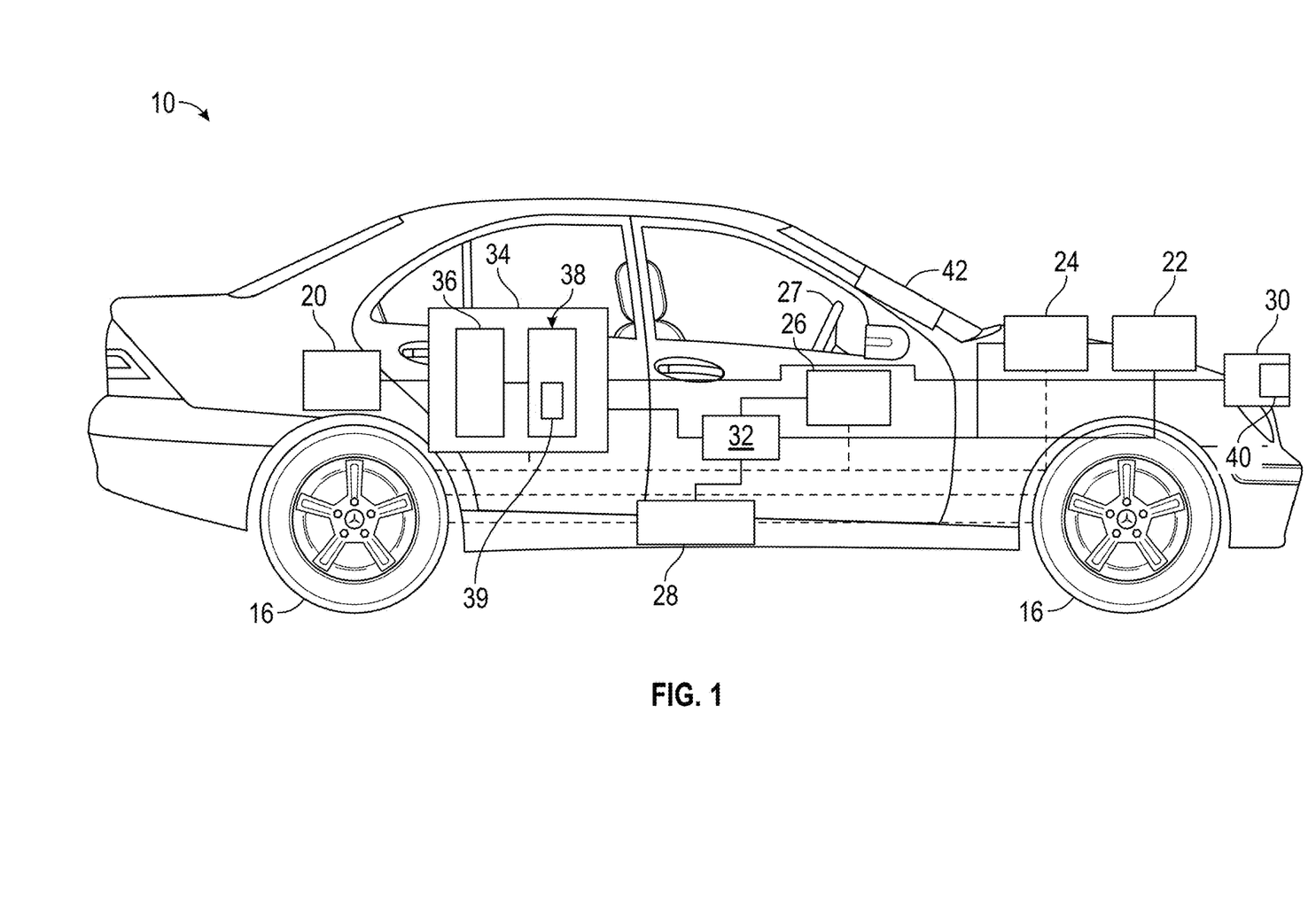
FIG. 1 shows a vehicle in accordance with an exemplary embodiment.

In accordance with an exemplary embodiment, FIG. 1 shows a vehicle 10. In various embodiments, the vehicle 10 can be a non-autonomous vehicle or an autonomous vehicle. An autonomous vehicle can be a so-called Level Four or Level Five automation system. A Level Four system indicates "high automation," referring to the driving mode-specific performance by an automated driving system of all aspects of the dynamic driving task, even if a human driver does not respond appropriately to a request to intervene. A Level Five system indicates "full automation," referring to the full-time performance by an automated driving system of all aspects of the dynamic driving task under all roadway and environmental conditions that can be managed by a human driver. It is to be understood that the system and methods disclosed herein can also be used with an autonomous vehicle operating at any of Levels One through Five.

The autonomous vehicle generally includes at least a navigation system 20, a propulsion system 22, a transmission system 24, a steering system 26, a brake system 28, a sensor system 30, an actuator system 32, and a controller 34. The navigation system 20 determines a road-level route plan for automated driving of the autonomous vehicle. The propulsion system 22 provides power for creating a motive force for the autonomous vehicle and can, in various embodiments, include an internal combustion engine, an electric machine such as a traction motor, and/or a fuel cell propulsion system. The transmission system 24 is configured to transmit power from the propulsion system 22 to two or more wheels 16 of the autonomous vehicle according to selectable speed ratios. The steering system 26 influences a position of the two or more wheels 16. While depicted as including a steering wheel 27 for illustrative purposes, in some embodiments contemplated within the scope of the present disclosure, the steering system 26 may not include a steering wheel 27. The brake system 28 is configured to provide braking torque to the two or more wheels 16.

The sensor system 30 includes a camera 40 that captures an image of an area surrounding the environment, such as a roadway in front of the autonomous vehicle. The camera 40 can be a digital camera having an array of photodetectors for capturing an image. Each photodetector can record an intensity of red, green, or blue light in an area of the image. In other embodiments, the camera 40 can be a video camera that captures video of the roadway while the autonomous vehicle is travelling over the roadway, using the array of photodetectors. The sensor system 30 can include additional sensors, such as radar, Lidar, etc.

The controller 34 builds a trajectory for the autonomous vehicle based on the output of sensor system 30. The controller 34 can provide the trajectory to the actuator system 32 to control the propulsion system 22, transmission system 24, steering system 26, and/or brake system 28 in order to navigate the autonomous vehicle with respect to various objects and other vehicles.

The controller 34 includes a processor 36 and a computer readable storage device or computer readable storage medium 38. The computer readable storage medium 38 includes programs or instructions 39 that, when executed by the processor 36, operate the autonomous vehicle based on sensor system outputs. In various embodiments, instructions include obtaining an image of a road segment from the camera 40, determining the location of virtual lane marks for the road segment, and displaying the virtual lane marks to a driver superimposed over the image. The virtual lane marks can be shown at a display 42 which can be a head-up display.

Figure 2:
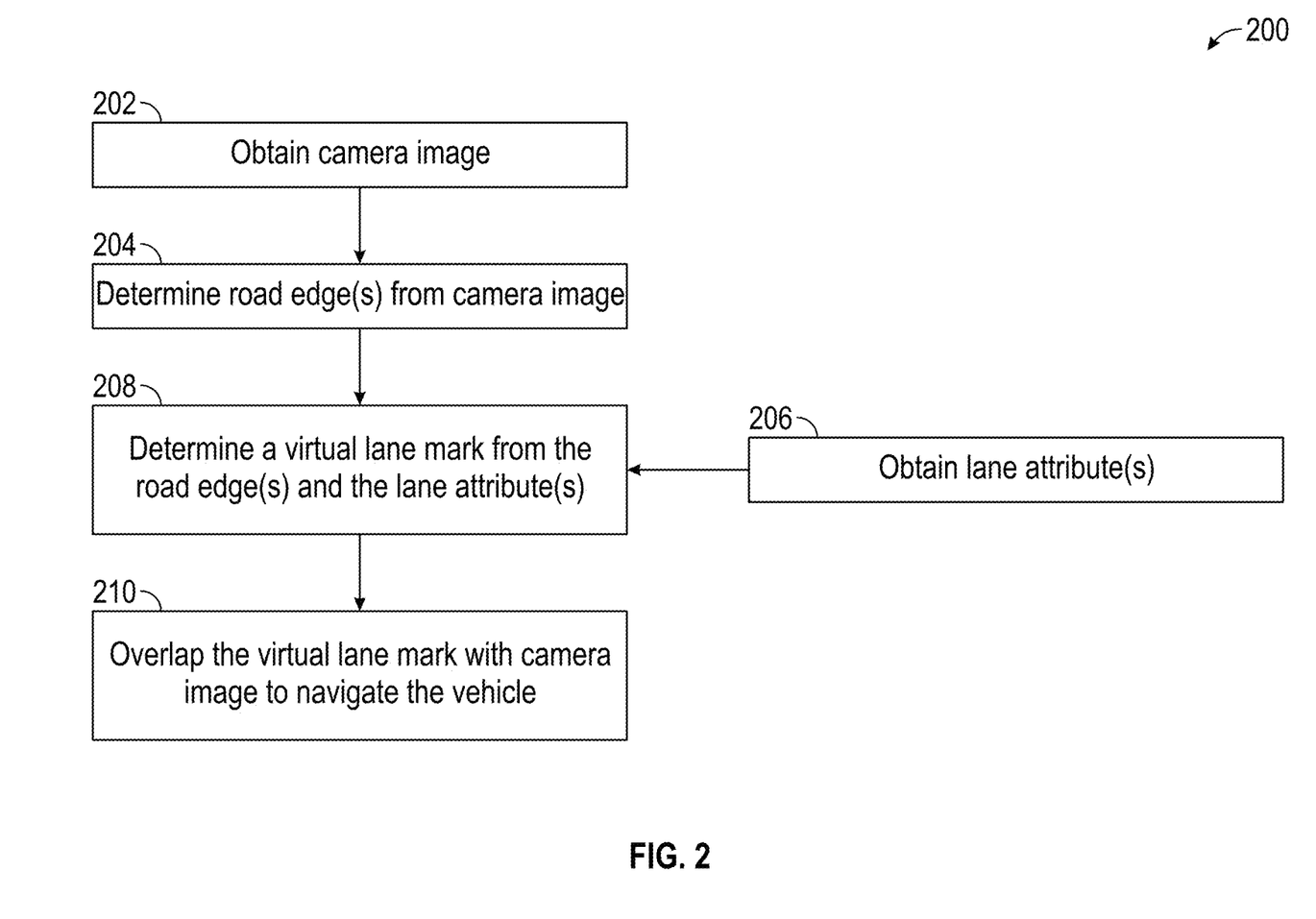
FIG. 2 shows a flowchart describing a method for navigating the vehicle of FIG. 1 using virtual lane marks, in an embodiment.

FIG. 2 shows a flowchart 200 describing a method for navigating the vehicle 10 using virtual lane marks, in an embodiment. In box 202, an image is obtained of a road segment. The image can be a digital image obtained at the camera 40 of the vehicle. In box 204, a road edge is determined from the image of the road segment. In box 206, a lane attribute is obtained for the road segment. The lane attribute can be obtained from a Global Positioning Satellite (GPS) server, map server, or other server type. In box 208, the road edge and the lane attribute are used to determine a virtual lane mark. In box 210, the virtual lane mark can be used to navigate the vehicle 10 by overlaying the virtual lane mark over the camera image in order to reveal a location of the lanes.

Figure 3:
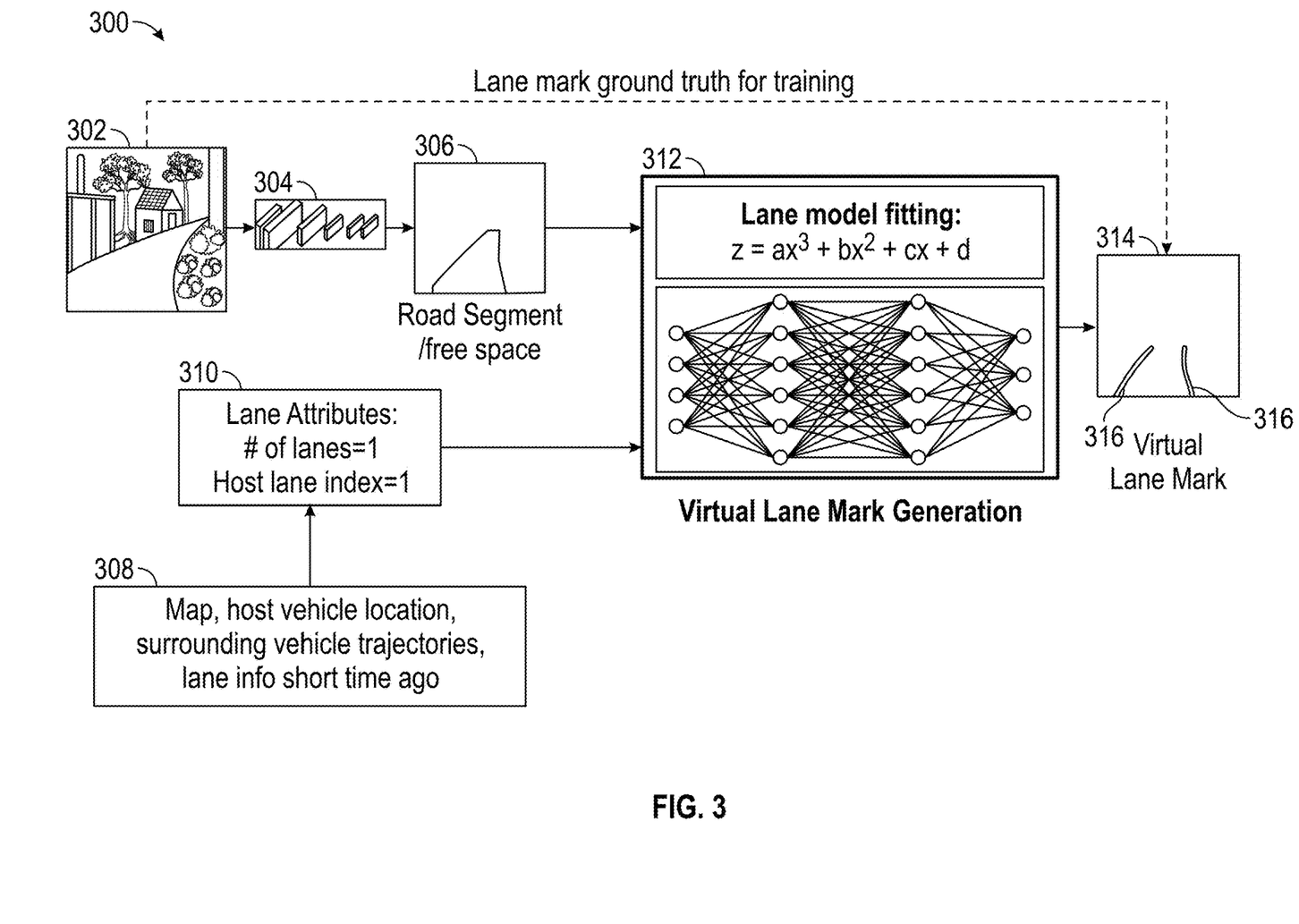
FIG. 3 is a diagram illustrating an operation for creating virtual lane marks, in an illustrative embodiment.

FIG. 3 is a diagram 300 illustrating an operation for creating virtual lane marks, in an illustrative embodiment. An original image 302 is provided to a road segmentation algorithm 304 for producing a road segmentation image 306. In various embodiments, the road segmentation can be performed at a neural network. The road segmentation image 306 includes at a least a first region representing an area of the image corresponding to the road and a second region representing an area of the image that does not correspond to the road.

State data 308 is used to determine lane attributes 310. State data 308 can include map data, a vehicle's location, a vehicle's trajectory, recently obtained lane information, etc. The lane attributes 310 can include the number of lanes in the road, a host index lane, etc. A host index lane is an index indicating the lanes in which the host vehicle is currently residing. The lane attributes 310 can also include the presence of an exit lane in the road segment, the presence of a merging lane in the road segment, and a presence of an intersection in the road segment.

The road segmentation image 306 and the lane attributes 310 are provided to a virtual lane mark generator 312. In various embodiments, the virtual lane mark generator 312 can be a neural network such as, for example, a conditional GAN, an autoencoder/decoder network, a multilayer perception network etc. In another embodiment, the virtual lane mark generator 312 fits a lane model equation to the road segmentation image based on the number of lanes to locate the virtual lane markers. The virtual lane mark generator 312 calculates the position of the virtual lane markers using the road segmentation image and the lane attributes. Output 314 shows an image with the virtual lane markers 316 therein. This output 314 can be overlaid over the original image 302 at the display 42.

Figure 4:
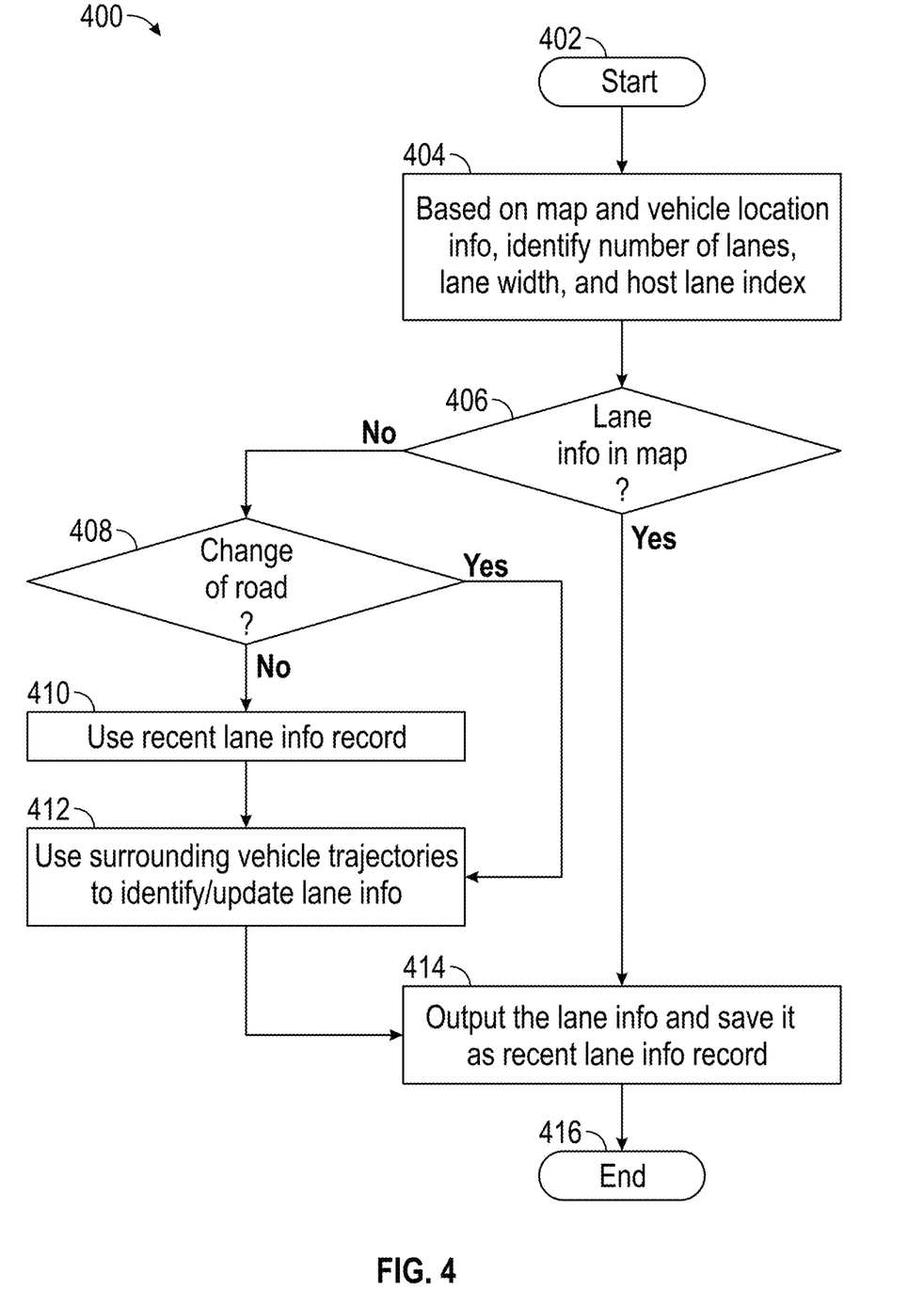
FIG. 4 shows a flowchart of a method for maintaining current lane attributes.

FIG. 4 shows a flowchart 400 of a method for maintaining current lane attributes. The method starts at box 402. In box 404, the lane attributes (i.e., number of lanes, lane width, host lane index) are identified based on the state data (i.e., map data, vehicle location, etc.). In box 406, it is determined whether all of the lane attributes are known from map data. If all of the lane attributes are known from the map data, the method proceeds to box 414. In box 414, the lane attributes are output for the virtual lane mark generation and stored in memory as a recent lane information record.

Returning to box 406, if not all of the lane attributes are known from the map data, the method proceeds to box 408. In box 408, it is determined whether the vehicle has recently changed from one road to a different road. If the vehicle has not changed to a different road, the method proceeds to box 410. Otherwise, the method proceeds to box 412. In box 410, the recent lane information data is pulled from memory. In box 412, the trajectories of one or more surrounding vehicles or agents are used to update the lane attributes in the recent lane information data. From box 412, the method proceeds to box 414, where the lane attributes are output for the virtual lane mark generation and stored in memory as an updated recent lane information record. From box 414, the method proceeds to box 416 at which point the method ends.

Figure 5:
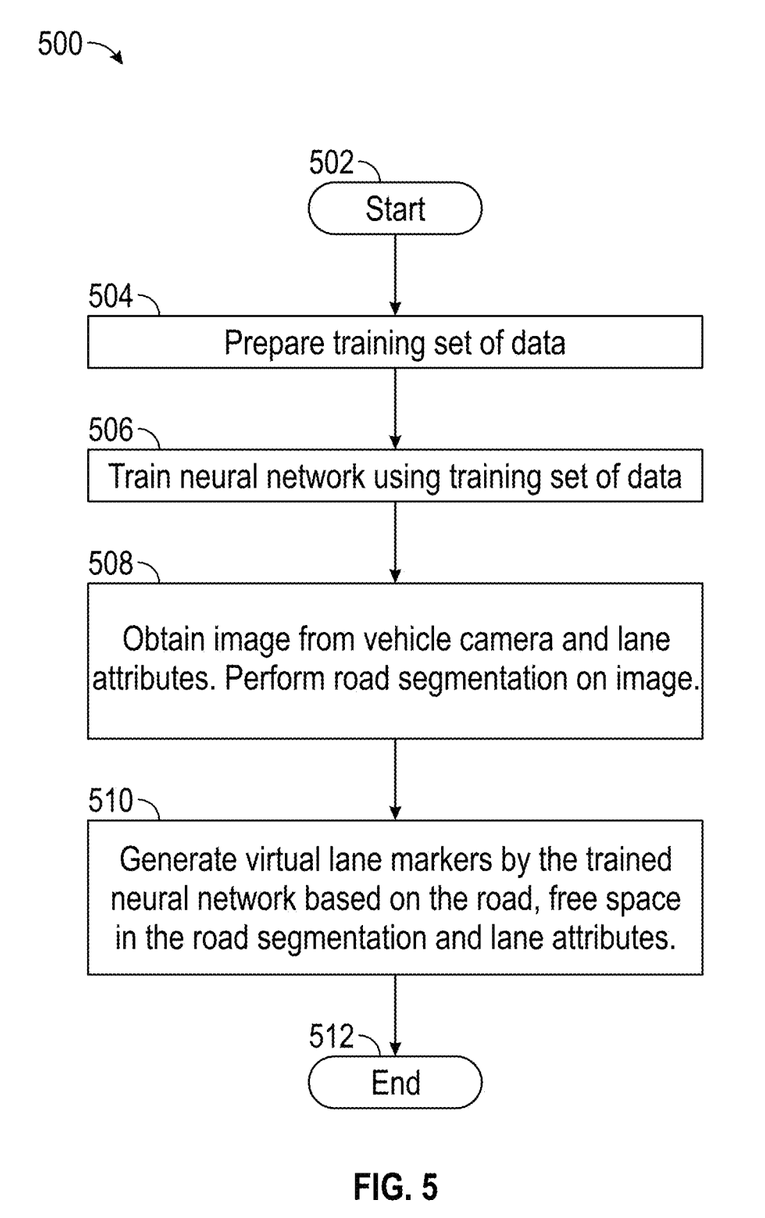
FIG. 5 shows a flowchart of a method for virtual lane mark generation using a neural network.

FIG. 5 shows a flowchart 500 of a method for virtual lane mark generation using a neural network. The method starts at box 502. In box 504, a training set of data is established. The training set of data can include road images with clear road marks that are obtained at different locations. In an embodiment, the training set of data can include road images without lane markers and the lane markers and lane attributes can be identified in the image using existing image classification methods. In another embodiment, the lane attributes can be entered manually.

In box 506, the training set of data is used to train the neural network. In box 508, the vehicle, while driving on the road, obtains an original image of the road and lane attribute data for the road and performs road segmentation on the original image. In box 510, the neural network generates the virtual lane marks based on free space region of the road image, and the lane attributes. The method ends at box 512.

Figure 6:
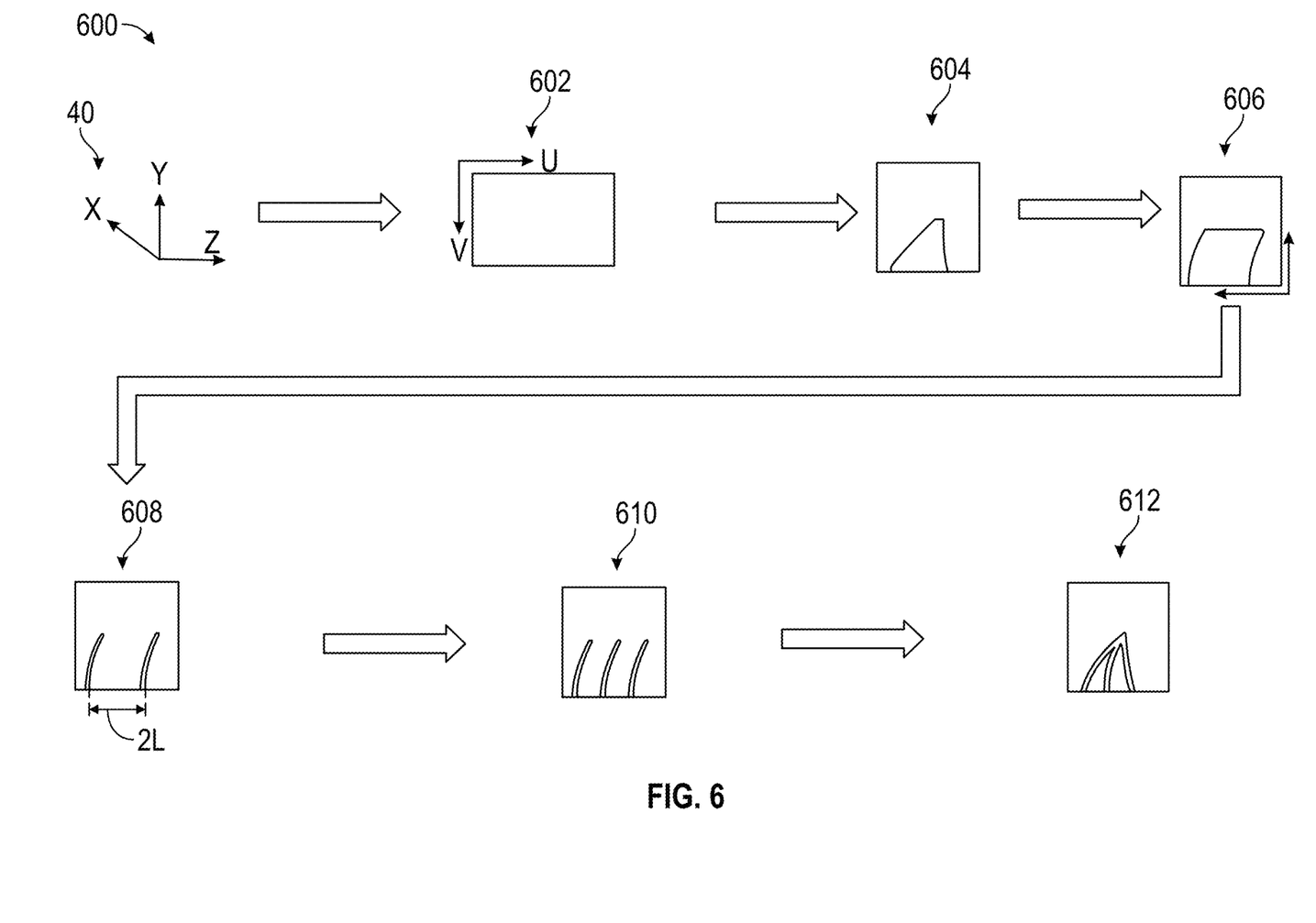
FIG. 6 shows a progression of images through the lane mark generation process by fitting the lane to a lane model equation.

FIG. 6 shows a progression 600 of images through the lane mark generation process by fitting the lane to a lane model equation. Camera 40 is shown with an associated camera coordinate system (X, Y, Z). The camera 40 obtains an original image 602 of the road. The original image 602 has an associated pixel coordinate system (u, v). The pixel coordinate system (u, v) is a coordinate system of an image plane of the camera and is related to the camera coordinate system (X, Y, Z) from forward projection of the image into the image plane. The relation between the camera coordinate system and the pixel coordinate system, is shown in Eqs. (1) and (2):

$$u = f_x * X/Z + O_x \qquad \text{Eq. (1)}$$

$$v = f_y * Y/Z + O_y \qquad \text{Eq. (2)}$$

where $f_x$ and $f_y$ are the x-coordinate and y-coordinate of the focal point of the camera, X, Y, and Z are the coordinates of the location in the camera coordinate system and $O_x$ and $O_y$ are the center (origin) of the pixel coordinates.

A road segmentation operation is then performed on the original image 602 to generate a road segmentation image 604. The road segmentation image 604 is then transformed to obtain a bird's eye view image 606 of the road. A suitable transformation from the pixel coordinate system to a bird's eye view coordinate system is given in Eqs. (3) and (4):

$$Z = f_y * H/(v - O_y) \qquad \text{Eq. (3)}$$

$$X = (u - O_x) * Z/f_x \qquad \text{Eq. (4)}$$

where H is a distance from the camera to ground. The bird's eye view image 606 is then used to identify road edges, shown in the road edge image 608. Lane model fitting can be applied to the bird's eye view. In one embodiment, the lane model fitting fits the road edges to a simple cubic equation, as shown in Eq. (5):

$$z = ax^3 + bx^2 + cx + d \qquad \text{Eq. (5)}$$

Parallel lane markings are then added into the road edge image 608, as shown in the marked BEV image 610. The lane markings are added in based on the lane attributes (number lanes, lane width, etc.) The marked BEV image 610 is then transformed back into the pixel coordinate system, as shown in final image 612. The transformation from the bird's eye view coordinate system to the pixel coordinate system is the inverse of the transformation shown in Eqs. (3) and (4).

Figure 7:
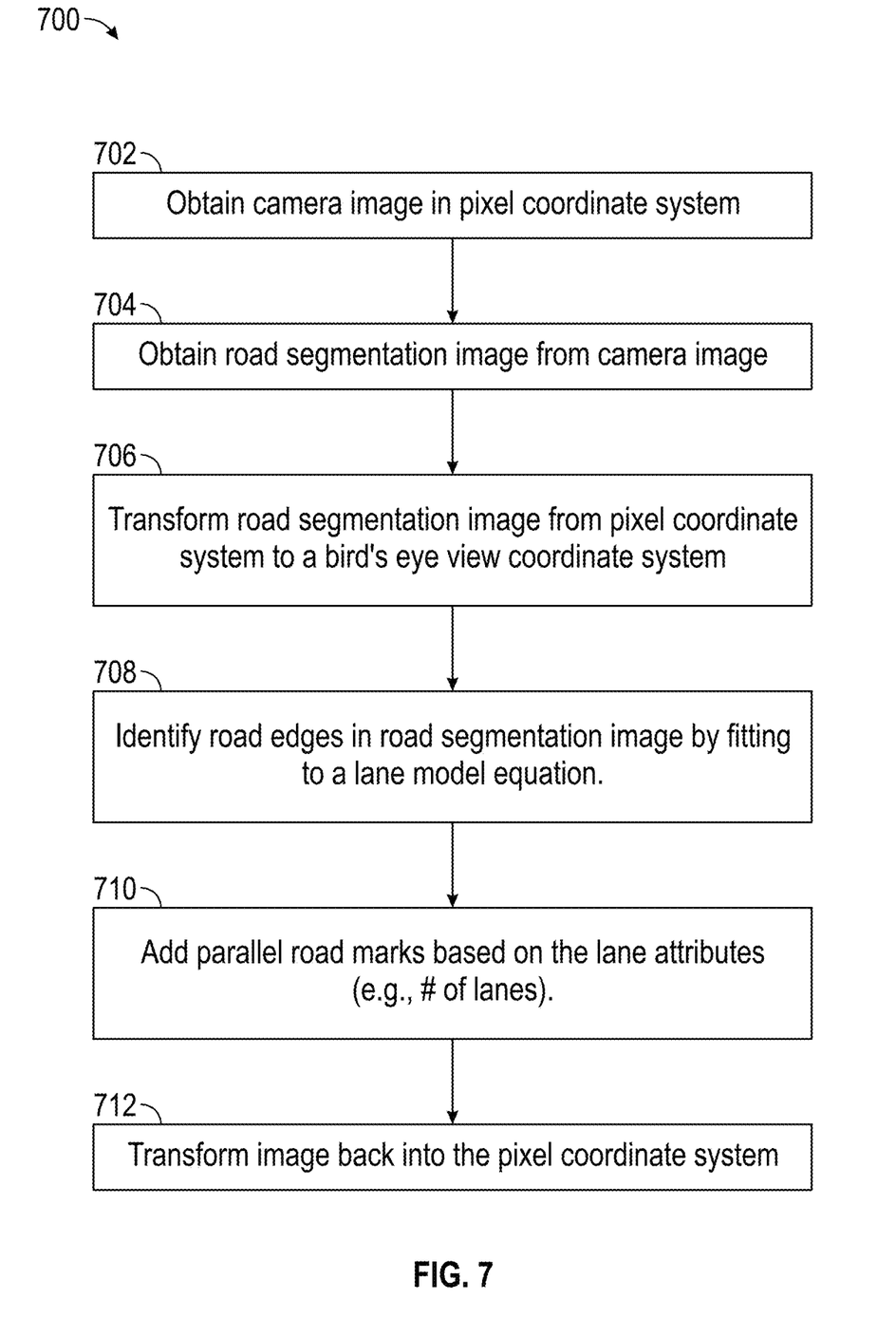
FIG. 7 illustrates flowchart of a method for generating virtual lane marks using a lane model equation.

FIG. 7 shows a flowchart 700 of a method for generating virtual lane marks using a lane model equation. In box 702, a camera image is obtained in a pixel coordinate system. In box 704, a road segmentation image is obtained from the camera image. In box 706, the road segmentation image is transformed from the pixel coordinate system to a bird's eye view coordinate system. In box 708, the lane model equation is used to identify one or more road edges in the bird's eye view image. In box 710, parallel lane marks are placed in the bird's eye view image based on the one or more road edges and the lane attributes, such as the number of lanes. In box 712, the image is transformed back into the pixel coordinate system.

Figure 8:
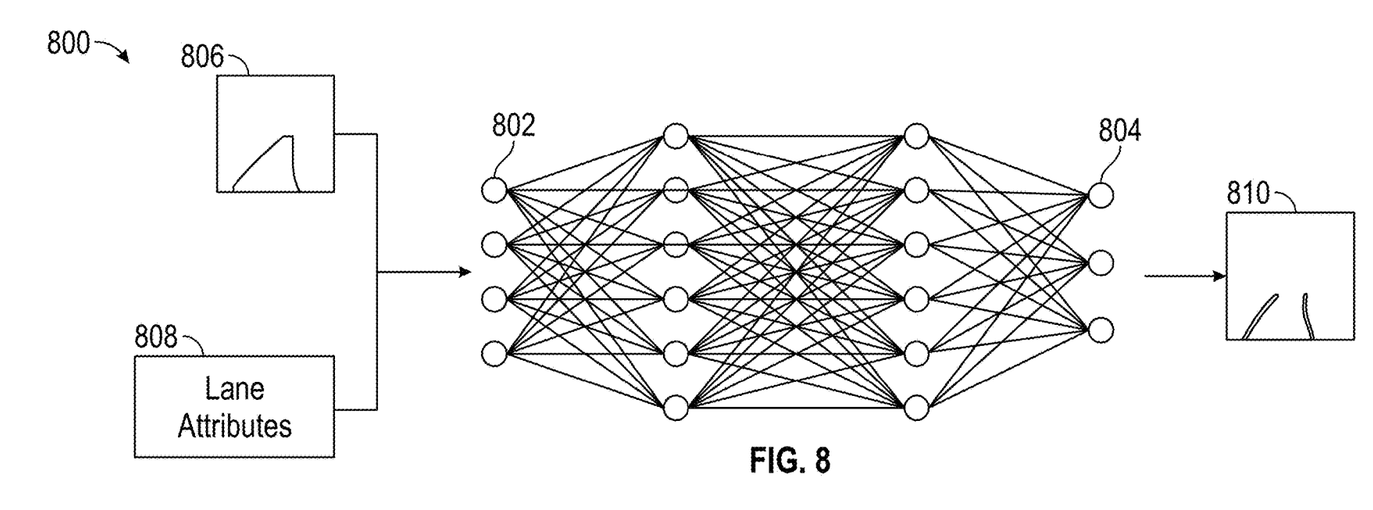
FIG. 8 shows an operation of a multi-layer perception network for use in virtual lane mark generation.

FIG. 8 illustrates operation of a multi-layer perception network 800 suitable for use in virtual lane mark generation. The multi-layer perception network 800 includes an input layer 802 and an output layer 804. The input layer 802 receives a road segmentation image 806 and lane attributes 808 and the output layer 804 outputs a virtual lane mark image 810.

Figure 9:
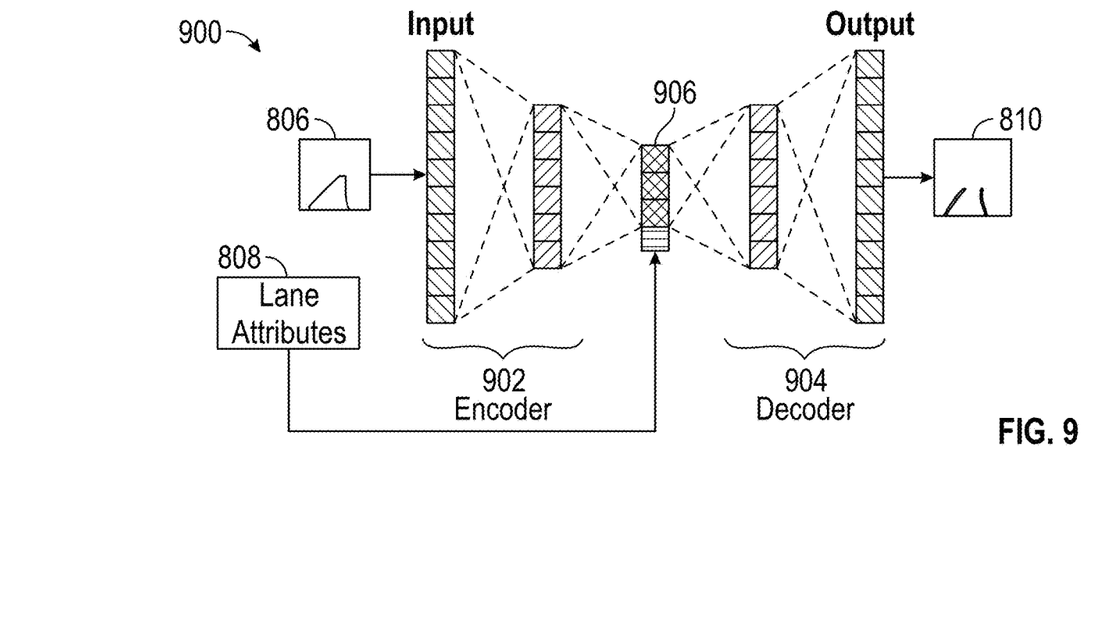
FIG. 9 shows an auto-encoder/decoder neural network for use in virtual lane mark generation.

FIG. 9 shows an auto-encoder/decoder neural network 900 for use in virtual lane mark generation. The auto-encoder/decoder neural network includes an encoder 902, a decoder 904 and an internal layer 906. The road segmentation image 806 is input at the encoder 902. The lane attributes 808 are input at the internal layer 906. The decoder 904 outputs the virtual lane mark image 810.

Figure 10:
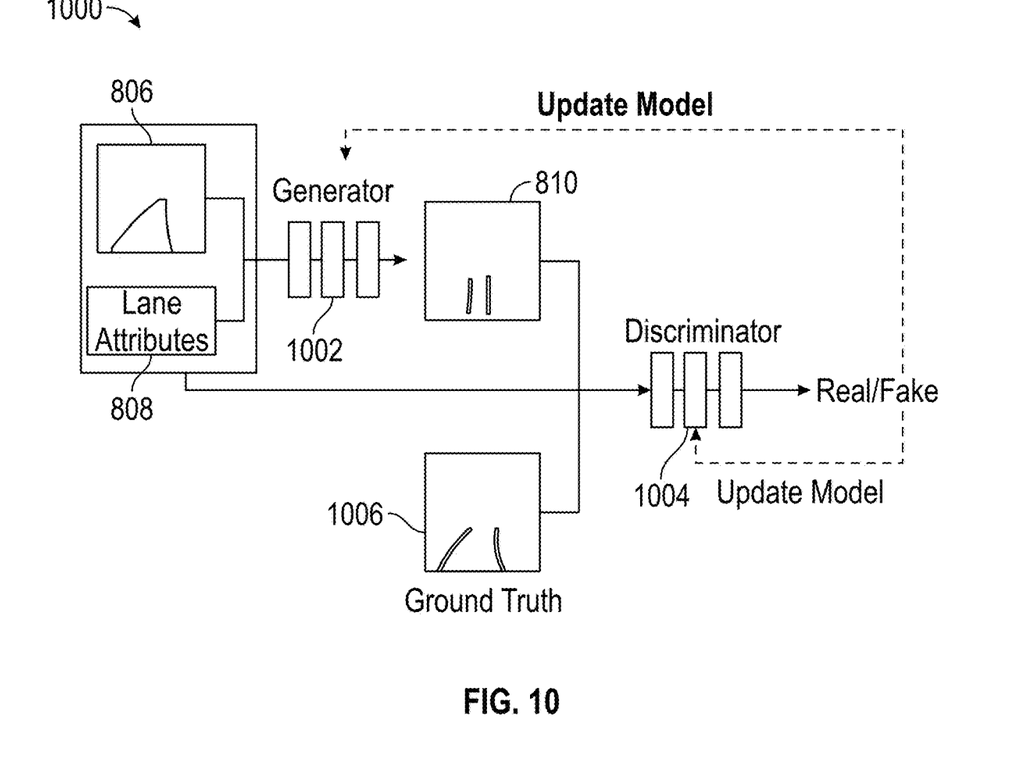
FIG. 10 shows a conditional generative adversarial network for use in virtual lane mark generation.

FIG. 10 shows a conditional generative adversarial network (GAN) 1000 for use in virtual lane mark generation. The GAN 1000 includes a generator 1002 and a discriminator 1004. A road segmentation image 806 and lane attributes 808 are input to the generator 1002, which outputs a virtual lane mark image 810. The virtual lane mark image 810, the lane attributes 808 and a ground truth image 1006 are entered into the discriminator 1004, which determines the validity of the virtual lane mark image 810 against the ground truth image 1006. The results of the validation can then be used to update the operation of the generator 1002.

Figure 11:
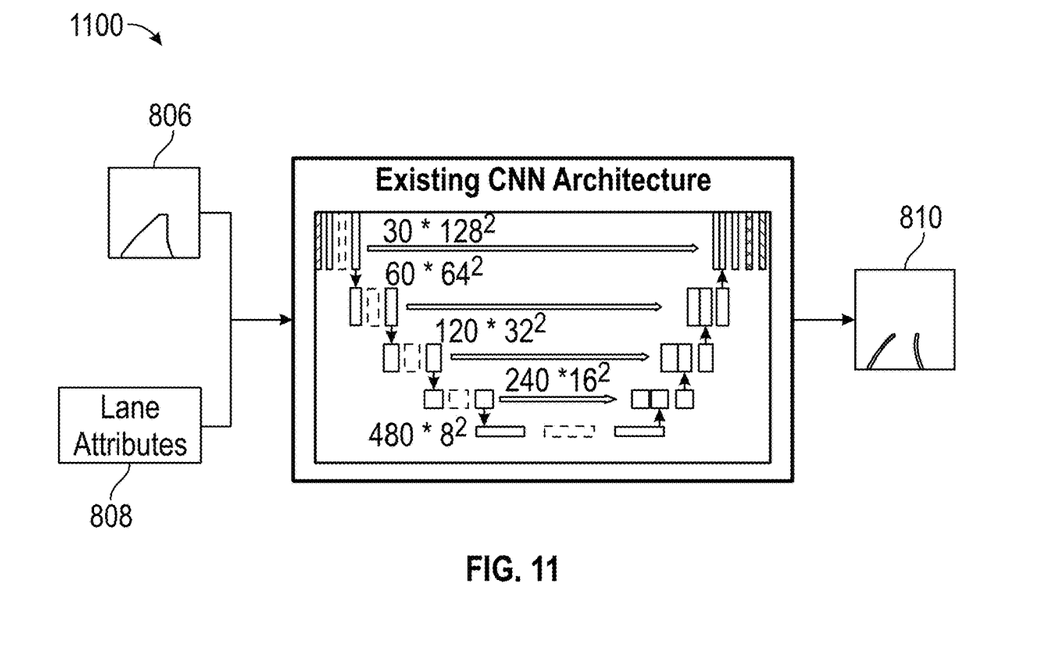
FIG. 11 shows a convolutional neural network for use in virtual lane mark generation.

FIG. 11 shows a convolutional neural network (CNN) 1100 for use in virtual lane mark generation. The road segmentation image 806 and lane attributes 808 are input to the CNN 1100 and the virtual lane mark image 810 is output from the CNN 1100.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A method for operating a vehicle, comprising:
    obtaining a camera image of a road segment using a camera at the vehicle;
    transforming the camera image from a pixel coordinate system to a bird's eye view coordinate system;
    determining a location of a road edge for the road segment within the camera image in the bird's eye view coordinate system;
    obtaining a lane attribute for the road segment;
    fitting the road edge to a lane model equation based on the lane attribute to obtain a virtual lane mark in the bird's eye view coordinate system; and
    moving the vehicle along the road segment by tracking the virtual lane mark.

2. The method of claim 1, further comprising fitting the lane model equation to pixels in the camera image indicative of the.

3. The method of claim 1, wherein the lane attribute includes at least one of: (i) a number of lanes in the road segment; (ii) a lane width for the road segment; (iii) a host lane index; (iv) a presence of an exit lane in the road segment; (v) a presence of a merging lane in the road segment; and (vi) a presence of an intersection in the road segment.

4. The method of claim 3, further comprising obtaining the lane attribute from at least one of: (i) a Global Positioning Satellite server; (ii) a map server; and (iii) a trajectory of one or more surrounding agents.

5. A method for operating a vehicle, comprising:
    obtaining a camera image of a road segment using a camera at the vehicle;
    obtaining a road segmentation image from the camera image;
    obtaining a lane attribute for the road segment;
    inputting the road segmentation image and the lane attribute into a neural network to generate a virtual lane mark; and
    moving the vehicle along the road segment by tracking the virtual lane mark.

6. The method of claim 5, wherein the neural network is at least one of: (i) a multilayer perception network; (ii) an autoencoder/decoder network; (iii) a conditional generative adversarial network; and (iv) a convolutional neural network.

7. The method of claim 5, wherein the lane attribute includes at least one of: (i) a number of lanes in the road segment; (ii) a lane width for the road segment; (iii) a host lane index; (iv) a presence of an exit lane in the road segment; (v) a presence of a merging lane in the road segment; and (vi) a presence of an intersection in the road segment.

8. A system for operating a vehicle, comprising:
    a camera configured to obtain a camera image of a road segment, wherein the camera image is in a pixel coordinate system; and
    a processor configured to:
        transform the camera image from the pixel coordinate system to a bird's eye view coordinate system;
        determine a location of a road edge for the road segment within the camera image in the bird's eye view coordinate system;
        obtain a lane attribute for the road segment;
        fit the road edge to a lane model equation based on the lane attribute to obtain a virtual lane mark in the bird's eye view coordinate system; and
        move the vehicle along the road segment by tracking the virtual lane mark.

9. The system of claim 8, wherein the processor is further configured to fit the lane model equation to pixels in the camera image indicative of the road edge.

10. The system of claim 8, wherein the lane attribute includes at least one of: (i) a number of lanes in the road segment; (ii) a lane width for the road segment; (iii) a host lane index; (iv) a presence of an exit lane in the road segment; (v) a presence of a merging lane in the road segment; and (vi) a presence of an intersection in the road segment.

11. The system of claim 10, wherein the processor is further configured to obtain the lane attribute from at least one of: (i) a Global Positioning Satellite server; (ii) a map server; and (iii) a trajectory of one or more surrounding agents.

12. A system for operating a vehicle, comprising:
    a camera configured to obtain a camera image of a road segment; and
    a processor configured to:
        generate a road segmentation image from the camera image;
        obtain a lane attribute for the road segment;
        operate a neural network to receive the lane attribute and the road segmentation image to output a virtual lane mark; and
        move the vehicle along the road segment by tracking the virtual lane mark.

13. The system of claim 12, wherein the neural network is at least one of: (i) a multilayer perception network; (ii) an autoencoder/decoder network; (iii) a conditional generative adversarial network; and (iv) a convolutional neural network.

14. The system of claim 12, wherein the lane attribute includes at least one of: (i) a number of lanes in the road segment; (ii) a lane width for the road segment; (iii) a host lane index; (iv) a presence of an exit lane in the road segment; (v) a presence of a merging lane in the road segment; and (vi) a presence of an intersection in the road segment.

15. A vehicle, comprising:
    a camera configured to obtain a camera image of a road segment, wherein the camera image is in a pixel coordinate system; and
    a processor configured to:
        transform the camera image from the pixel coordinate system to a bird's eye view coordinate system;

determine a location of a road edge for the road segment within the camera image in the bird's eye view coordinate system;

obtain a lane attribute for the road segment;

fit the road edge to a lane model equation based on the lane attribute to obtain a virtual lane mark in the bird's eye view coordinate system; and move the vehicle along the road segment by tracking the virtual lane mark.

16. The vehicle of claim 15, wherein the processor is further configured to fit the lane model equation to pixels in the camera image indicative of the road edge.

17. The vehicle of claim 15, wherein the lane attribute includes at least one of: (i) a number of lanes in the road segment; (ii) a lane width for the road segment; (iii) a host lane index; (iv) a presence of an exit lane in the road segment; (v) a presence of a merging lane in the road segment; and (vi) a presence of an intersection in the road segment.

18. A system for operating a vehicle, comprising:

a camera configured to obtain a camera image of a road segment; and a processor configured to:

generate a road segmentation image from the camera image;

obtain a lane attribute for the road segment;

operate a neural network to receive the lane attribute and the road segmentation image and to output a virtual lane mark; and move the vehicle along the road segment by tracking the virtual land mark.

19. The vehicle of claim 18, wherein the neural network is at least one of: (i) a multilayer perception network; (ii) an autoencoder/decoder network; (iii) a conditional generative adversarial network; and (iv) a convolutional neural network.

20. The vehicle of claim 18, wherein the lane attribute includes at least one of: (i) a number of lanes in the road segment; (ii) a lane width for the road segment; (iii) a host lane index; (iv) a presence of an exit lane in the road segment; (v) a presence of a merging lane in the road segment; and (vi) a presence of an intersection in the road segment.

* * * * *